(12) United States Patent
Perrie et al.

(10) Patent No.: US 8,352,187 B2
(45) Date of Patent: Jan. 8, 2013

(54) METHOD AND SYSTEM FOR MONITORING PARAMETERS OF AN AIRCRAFT

(75) Inventors: Jean-Damien Perrie, Toulouse (FR); Guillaume Preaux, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 442 days.

(21) Appl. No.: 12/622,560

(22) Filed: Nov. 20, 2009

(65) Prior Publication Data

US 2010/0131230 A1 May 27, 2010

(30) Foreign Application Priority Data

Nov. 24, 2008 (FR) ..................... 08 06589

(51) Int. Cl.
*G01W 1/00* (2006.01)

(52) U.S. Cl. .............. 702/3; 702/45; 702/142; 702/144; 702/189

(58) Field of Classification Search ................. 701/7, 8, 701/13; 702/3, 45, 142, 144, 189
See application file for complete search history.

(56) References Cited

U.S. PATENT DOCUMENTS

| | | | |
|---|---|---|---|
| 4,829,441 A * | 5/1989 | Mandle et al. | 702/96 |
| 4,970,651 A | 11/1990 | Favre et al. | |
| 5,648,604 A | 7/1997 | Morbieu | |
| 6,250,149 B1 * | 6/2001 | Black | 73/178 R |
| 6,871,487 B2 * | 3/2005 | Kurtz et al. | 60/39.281 |
| 8,095,251 B2 * | 1/2012 | Preaux | 701/7 |
| 2004/0027570 A1 | 2/2004 | Caldwell et al. | |

FOREIGN PATENT DOCUMENTS

| | | |
|---|---|---|
| FR | 2891368 | 3/2007 |
| WO | WO 2007/036662 | 4/2007 |

OTHER PUBLICATIONS

Calia, et al., "Air Data Failure Management in a Full-Authority Fly-By-Wire Control System", Control Applications, IEEE Conference, Oct. 1, 2006, pp. 3277-3281.

* cited by examiner

*Primary Examiner* — Mohamed Charioui
*Assistant Examiner* — Elias Desta
(74) *Attorney, Agent, or Firm* — Novak Druce + Quigg LLP

(57) ABSTRACT

A monitoring system including two laser anemometers and a selection logic device able to select, on the one hand, a value of the IAS air speed to be displayed on first display means and, on the other hand, another value of the IAS air speed to be displayed on second display means.

10 Claims, 2 Drawing Sheets

METHOD AND SYSTEM FOR MONITORING PARAMETERS OF AN AIRCRAFT

CROSS-REFERENCE TO RELATED APPLICATIONS

This application claims priority to French Patent Application 0806589, filed Nov. 24, 2008, the entire contents of which are incorporated herein by reference.

FIELD OF THE INVENTION

The present invention relates to a method and a system for monitoring parameters of an aircraft, as well as to an aircraft provided with such a monitoring system.

DESCRIPTION OF THE PRIOR ART

A system for monitoring anemobaroclinometric parameters of an aircraft (that is to say parameters related to the position and to the air speed of the aircraft in flight with respect to the surrounding air) is already known through the document WO2007/036662. These anemobaroclinometric parameters can be:
- the static pressure of the aircraft;
- the dynamic pressure of the aircraft;
- the total temperature of the aircraft;
- the angle of attack of the aircraft;
- the angle of sideslip of the aircraft;
- the true air speed TAS of the aircraft;
- the corrected air speed CAS (or "Computed Air Speed" as it is known) of the aircraft;
- the air speed displayed IAS (or "Indicated Air Speed" as it is known) in the cockpit of the aircraft; and
- the Mach number of the aircraft.

This monitoring system comprises a primary detection circuit, provided with three distinct measurement pathways, and a backup secondary detection circuit. Furthermore, it comprises at least one laser anemometer able to measure certain anemobaroclinometric parameters. This laser anemometer can be integrated either within said primary detection circuit, or within said secondary detection circuit.

Thus, the reliability of the monitoring system is improved by the presence of the laser anemometer which uses optical technology, different from the mechanical technology implemented in the primary and secondary detection circuits.

SUMMARY OF THE INVENTION

The object of the present invention is to refine the abovementioned monitoring system.

To this end, according to the invention, the method for monitoring parameters of an aircraft equipped with first and second display means as well as with a plurality of measurement means, according to which method there is performed:
- a first measurement and a second measurement of a first air speed parameter (for example the true air speed TAS of said aircraft) by means respectively of first measurement means and of second measurement means; and
- a third measurement of said first air speed parameter by means of a first laser anemometer, is noteworthy in that the following steps are furthermore carried out:
A/—a fourth measurement of said first air speed parameter is performed by means of a second laser anemometer;
B/—at least one of said measurements of said first air speed parameter is compared with a predetermined speed threshold;
C/—when said first air speed parameter is at most equal to said predetermined speed threshold, the following steps are performed successively:
- a first value and a second value of a second air speed parameter (for example the IAS air speed displayed on the display means) are determined on the basis respectively of said third measurement and of said fourth measurement; and
- said first value and said second value determined are displayed respectively on said first display means and said second display means;

D/—when said first air speed parameter is greater than said predetermined speed threshold, the following steps are performed:
- a third value and a fourth value of said second air speed parameter are determined on the basis respectively of said first measurement and of said second measurement; and
- said third value and said fourth value determined are displayed respectively on said first display means and said second display means, as replacement for those currently displayed.

Thus, by virtue of the invention, a redundancy of the measurements, at least of the first air speed parameter, is effected with the help of means based on dissimilar physical measurement principles. Furthermore, the values displayed on the first and the second display means are those which exhibit the best integrity (that is to say which comprise the fewest alterations), as a function of the aircraft's flight phase.

According to a preferred implementation of the invention, it is furthermore possible to carry out the following steps:
- a check is performed, prior to step D/, to verify that said first measurement and said second measurement of said first air speed parameter are each valid, by comparing them with a first predefined reference value;
- when said first measurement is not valid, said first air speed parameter is measured again by means of said first laser anemometer so as thereafter to determine a fifth value of said second air speed parameter and said fifth value determined is displayed on said first display means; and
- when said second measurement is not valid, said first air speed parameter is measured again by means of said second laser anemometer so as thereafter to determine a sixth value of said second air speed parameter and said sixth value determined is displayed on said second display means.

Moreover, it is possible to perform a fifth measurement of said first air speed parameter by means of third measurement means with which is associated a selection switch able to occupy at least one distinct first position and one distinct second position. Furthermore said selection switch can be previously positioned in one of said positions and, when said first air speed parameter is greater than said predetermined speed threshold, it is advantageously possible to carry out the following steps:
- a seventh value of said second parameter is determined on the basis of said fifth measurement;
- when said selection switch occupies said first position, said seventh value determined is displayed on said first display means, as replacement for said currently displayed value; and when said selection switch occupies said second position, said seventh value determined is displayed on said second display means, as replacement for said currently displayed value.

Thus, logic is obtained for selecting the values of the second air speed parameter to be displayed on the display means, from among the values determined on the basis of the measurements performed either by the measurement means, or by the laser anemometers.

Moreover, prior to steps C/ and D/, it is advantageously possible to perform a check to verify that said third measurement and said fourth measurement of said first air speed parameter are each valid by comparison with a second predefined reference value.

Furthermore, said first measurement means and said first laser anemometer can perform respectively said first measurement and said third measurement on the left longitudinal side of said aircraft, and said second measurement means and said second laser anemometer can perform respectively said second measurement and said fourth measurement on the right longitudinal side of said aircraft.

Preferably, said first and second display means are disposed respectively on the left and on the right inside the cockpit of said aircraft.

Moreover, although the two laser anemometers can be disposed one above the other (for example at the level of the vertical empennage or of the nose of the aircraft), said first laser anemometer is preferably disposed on the left side of said aircraft (for example at the level of the wing or of the nose cone) and said second laser anemometer is preferably disposed on the right side of the latter. Whatever the location of the laser anemometers on the aircraft, their focal length is chosen preferably greater than the thickness of the boundary layer existing on the surface of the aircraft.

Moreover, according to the preferred implementation, said first laser anemometer and said second laser anemometer each perform measurements in relation to a single measurement axis.

Moreover, the invention relates to a system for the implementation of the method such as previously mentioned.

According to the invention, said system which comprises:
said first measurement means with which first processing means are associated;
said second measurement means with which second processing means are associated;
said first display means and said second display means; and
said first laser anemometer with which first calculation means are associated,
is noteworthy in that it furthermore comprises:
at least said second laser anemometer with which second calculation means are associated; and
a selection logic device able to select, as a function of said predetermined speed threshold, on the one hand, the value of said second air speed parameter from among said first value and said third value determined respectively by said first processing means and said first calculation means so as to display it on said first display means and, on the other hand, the value of said second air speed parameter from among said second value and said fourth value determined respectively by said second processing means and said second calculation means so as to display it on said second display means.

The invention also relates to an aircraft which comprises a monitoring system such as described above.

BRIEF DESCRIPTION OF THE DRAWINGS

The figures of the appended drawing will elucidate the manner in which the invention may be embodied. In these figures, identical references designate similar elements.

PREFERRED EMBODIMENTS OF THE INVENTION

Figure 1:
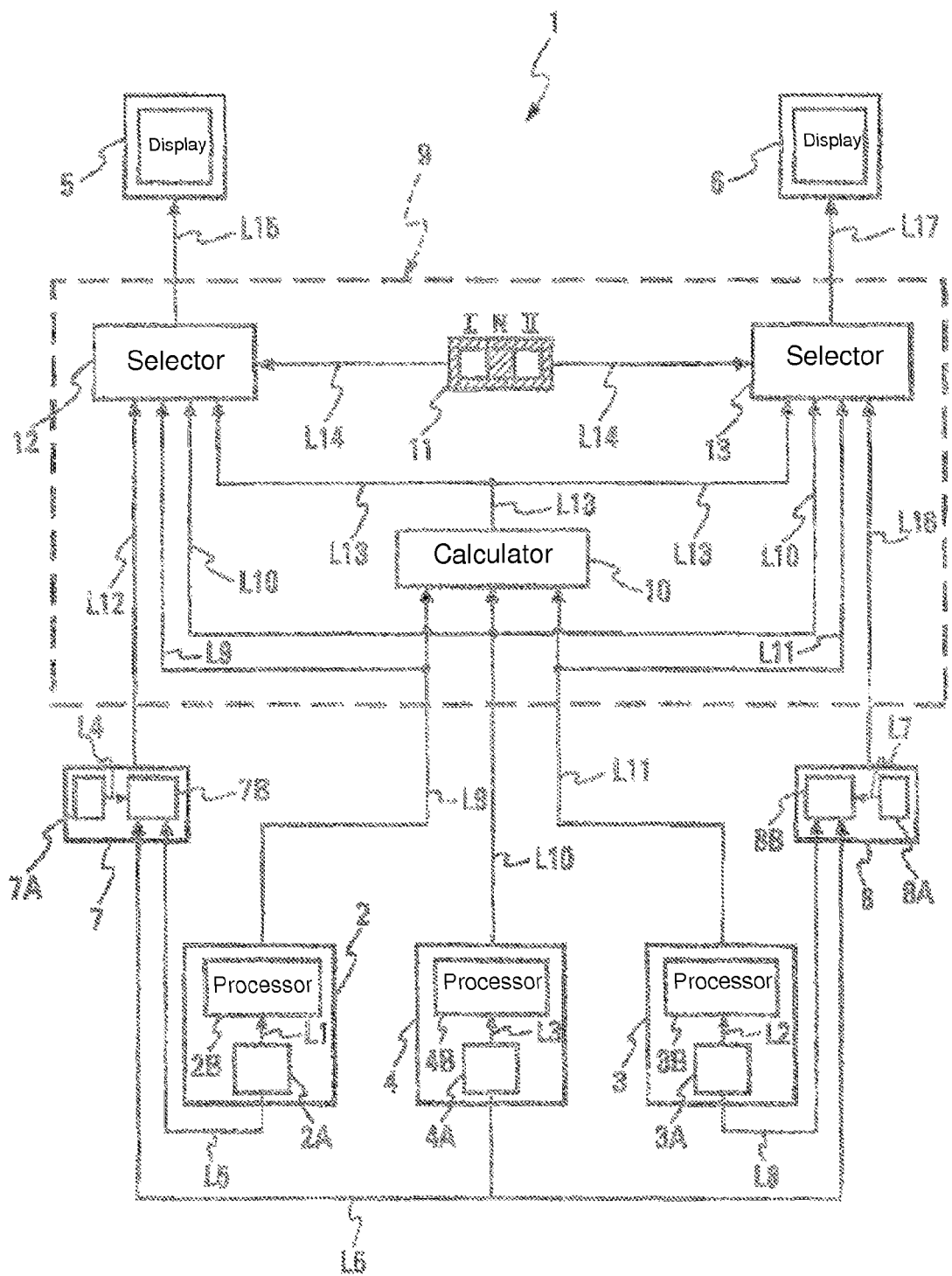
FIG. 1 represents a schematic diagram of the monitoring system carried onboard an aircraft, according to an embodiment in accordance with the invention.

Represented in FIG. 1 is the schematic diagram of a system 1 for monitoring the anemobaroclinometric parameters of an aircraft (not represented).

As shown by FIG. 1, the monitoring system 1 comprises:
first determination means 2 for determining the IAS speed of the aircraft in the vicinity of the left longitudinal side of the latter. These first determination means 2 comprise first measurement means 2A for measuring anemobaroclinometric parameters (such as a static pressure probe, a temperature probe, a probe for measuring the angle of attack, a multifunction probe, etc.) able to perform measurements of these parameters on the left longitudinal side of the aircraft. The first determination means furthermore comprise first processing means 2B able to receive, by way of the link L1, the measurements performed by the first measurement means 2A;
second determination means 3 for determining the IAS speed of the aircraft in the vicinity of the right longitudinal side of the latter. These second determination means 3 comprise second measurement means 3A for measuring anemobaroclinometric parameters able to perform measurements of these parameters on the right longitudinal side of the aircraft. The second determination means 3 furthermore comprise second processing means 3B able to receive, by way of the link L2, the measurements carried out by the second measurement means 3A;
third determination means 4 for determining the IAS speed of the aircraft. These third determination means 4 comprise third measurement means 4A for measuring anemobaroclinometric parameters able to carry out measurements of these parameters at one and the same time on the right longitudinal side and on the left longitudinal side of the aircraft. The third determination means 4 furthermore comprise third processing means 4B able to receive, by way of the link L3, the measurements performed by the third measurement means 4A;
first display means 5 disposed on the left in the cockpit of the aircraft. These first display means 5 are able to display the IAS speed determined by the first determination means 2 or by the third determination means 4; and
second display means 6 disposed on the right in the cockpit of the aircraft. These second display means 6 are able to display the IAS speed determined by the second determination means 3 or by the third determination means 4. Of course, other parameters will be able to be displayed on the first and second display means 5 and 6.

According to an embodiment in accordance with the present invention, the monitoring system 1 furthermore comprises:
first laser anemometric means 7 comprising a first laser anemometer 7A with a single laser measurement axis, disposed on the left longitudinal side of the aircraft. This first laser anemometer 7A, able to measure the TAS true air speed of the aircraft, can for example use infrared (IR) laser technology. Furthermore, the first laser anemometric means 7 comprise first calculation means 7B able to determine the IAS speed, in the vicinity of the left longitudinal side of the aircraft, on the basis of the TAS speed measurements provided by the first laser anemometer 7A, as well as on the basis of the measurements carried out by the first and third measurement means 2A and 4A, by way respectively of the links L4, L5 and L6;

second laser anemometric means 8 which comprise a second infrared laser anemometer 8A with a single laser measurement axis, disposed on the right longitudinal side of the aircraft. They also comprise first calculation means 8B able to determine the IAS speed, in the vicinity of the right longitudinal side of said aircraft, on the basis of the TAS speed measurements provided by the second laser anemometer 8A as well as on the basis of the measurements performed by the second and third measurement means 3A and 4A, by way respectively of the links L7, L8 and L6. As a variant, the first and second laser anemometers 7A and 8A can implement ultraviolet (UV) laser technology. They are then able to measure the speed TAS, the static pressure Ps as well as the temperature TAT. The first and second calculation means 7B and 8B are then no longer indispensable (the links L5, L6 and L8 no longer exist). It is thus possible to also display the parameter TAT measured on the display means 5 and 6; and a selection logic device 9 for selecting the IAS speed to be displayed, on the one hand, on the first display means 5 and, on the other hand, on the second display means 6. It comprises:

means 10 able to calculate the arithmetic mean of the speeds TAS provided by the first, second and third determination means 2, 3 and 4, by way respectively of the links L9, L10 and L11, and to transmit the mean determined to first selection means 12 and to second selection means 13 (described hereinafter);

a selection switch 11 with three positions. This selection switch 11 can be operated intentionally by the pilots or automatically. When the selection switch 11 occupies a first position I (respectively a second position II), the IAS speed determined by the third determination means 4 is displayed on the first display means 5 (respectively the second display means 6). On the other hand, when the selection switch 11 occupies a third position N, the IAS speed determined by the third determination means 4 will not be able to be displayed on the display means 5 or 6;

the first selection means 12 connected to the first and third determination means 2 and 4, to the first laser anemometric means 7 as well as to the means 10, by way respectively of the links L9, L10, L12 and L13. They are furthermore connected to the selection switch 11, by way of the link L14. These first selection means 12 are able to select, according to the selection logic (defined hereinafter), the IAS speed associated with the left longitudinal side of the aircraft to be displayed on the first display means 5, by way of the link L15, from among the IAS speeds determined by the means 2, 4 or 7; and the second selection means 13 connected to the second and third determination means 3 and 4, to the second laser anemometric means 8, to the means 10 as well as to the selection switch 11, by way respectively of the links L11, L10, L16, L13 and L14. The second selection means 13 are able to select, according to the selection logic, the IAS speed associated with the right longitudinal side of the aircraft to be displayed on the second display means 6, by way of the link L17, from among the IAS speeds determined by the means 3, 4 or 8.

According to the embodiment of the invention, the selection device 9 selection logic is defined in the following manner:

when the TAS speed of the aircraft lies between the zero speed and a predetermined speed threshold (for example 160 kts), the IAS speed which is selected by the first selection means 12 (respectively the second selection means 13) so as to be displayed on the first display means 5 (respectively the second display means 6) is the IAS speed obtained by the first laser anemometric means 7 (respectively the second laser anemometric means 8) on the basis of the TAS speed measured by the first laser anemometer 7A (respectively the second laser anemometer 8A); and when the TAS speed of the aircraft lies between said predetermined threshold and the maximum operational speed VMO, the IAS speed selected by the first selection means 12 (respectively the second selection means 13) so as to be displayed on the first display means 5 (respectively the second display means 6) corresponds:

either to the IAS speed determined by the first determination means 2 (respectively the second determination means 3) when the TAS speed measured by the first measurement means 2A (respectively the second measurement means 3A) is judged valid by the first selection means 12 (respectively the second selection means 13) and when said selection switch 11 is not in the first position I (respectively in the second position II);

or to the IAS speed determined by the third determination means 4, when the selection switch 11 is in the first position I (respectively in the second position II), when the TAS speed measured by the first measurement means 2A (respectively the second measurement means 3A) is judged valid or invalid by the first selection means 12 (respectively the second selection means 13);

or to the IAS speed determined by the first laser anemometric means 7 (respectively the second laser anemometric means 8), when the TAS speed measured by the first measurement means 2A (respectively the second measurement means 3A) is judged invalid by the first selection means 12 (respectively the second selection means 13) and when the selection switch 11 associated with the third determination means 4 is not in the first position I (respectively not in the second position II). As a variant or supplement, the first selection means 12 (respectively the second selection means 13) can perform a check to verify the validity of the TAS speed measured by the first laser anemometer 7A (respectively the second laser anemometer 8A) and used by the first laser anemometric means 7 (respectively the second laser anemometric means 8) for determining the IAS value.

To judge the validity or invalidity of the TAS speed measured by the first measurement means 2A (respectively the second measurement means 3A), the first selection means 12 (respectively the second selection means 13) are able to perform the comparison of said determined TAS speed with a reference value, equal for example to the TAS speed determined by backup determination means not represented in FIG. 1, or by the first laser anemometer 7A (respectively the second laser anemometer 8A). Thus, the TAS speed measured by the first measurement means 2A (respectively the second measurement means 3A) is judged valid when it is at least approximately equal to this reference value, and invalid in the converse case.

Furthermore, the first selection means 12 (respectively the second selection means 13) are able to carry out the comparison of the TAS speed measured by the first laser anemometer 7A (respectively the second laser anemometer 8A) with the arithmetic mean of the speeds TAS, as determined by the means 10, so as to judge the validity of the speed TAS measured. Thus, the TAS speed measured by the first laser anemometer 7A (respectively the second laser anemometer 8A) is judged valid when it is at least approximately equal to this mean value, and invalid in the converse case.

Moreover, when the TAS speed used to determine the IAS speed displayed at a given instant on the first display means 5 (respectively the second display means 6) is judged invalid by the first selection means 12 (respectively the second selection means 13) and when a difference of a few knots exists with the new IAS speed selected, a smoothing between the two values can be performed automatically by the first selection means 12 (respectively the second selection means 13).

Figure 2:
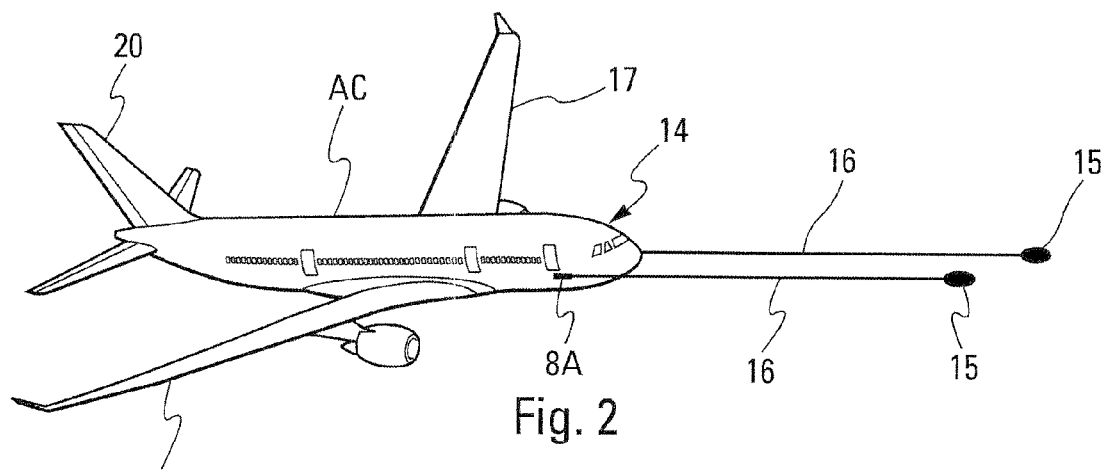
FIGS. 2 and 3 represent, in a schematic manner, respectively a first example and a second example of the location of the laser anemometers on the aircraft, according to the embodiment in accordance with the present invention.
Figure 3:
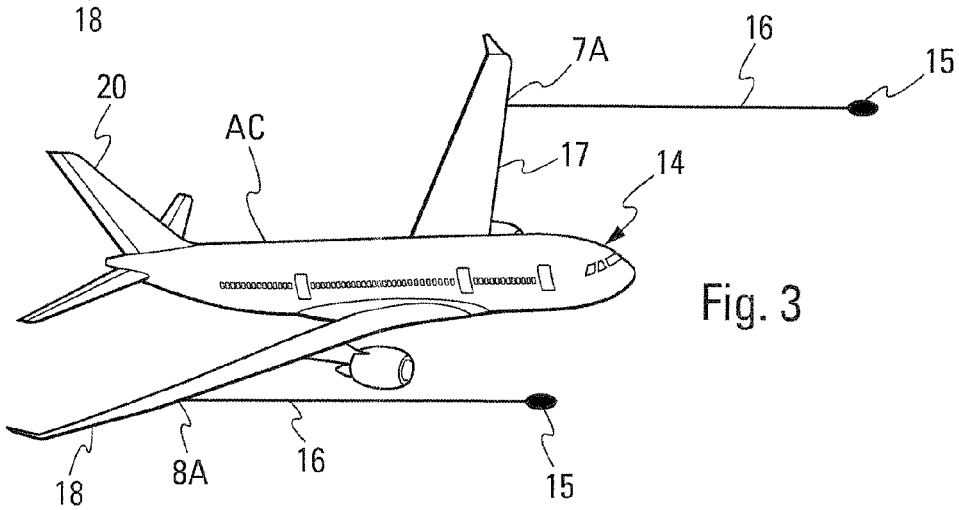

Moreover, according to the embodiment in accordance with the present invention, as shown by FIGS. 2 and 3, the laser anemometers 7A and 8A with a single measurement axis, belonging to the monitoring system 1, can be disposed:
  either respectively on the left and on the right of the nose cone 14 of the aircraft AC (FIG. 2). The focal length of the laser anemometers 7A and 8A is preferably chosen in such a way that the measurement point 15 of each laser axis 16 is outside of the disturbed zone of the stopping point of the nose cone 14. Furthermore, the laser axes 16 can be disposed at least approximately parallel to the longitudinal axis of the aircraft AC;
  or respectively on the left wing 17 and the right wing 18 of the aircraft AC (FIG. 3), the laser axis 16 of each anemometer 7A and 8A being approximately parallel to the longitudinal axis of the aircraft AC.

Figure 4:
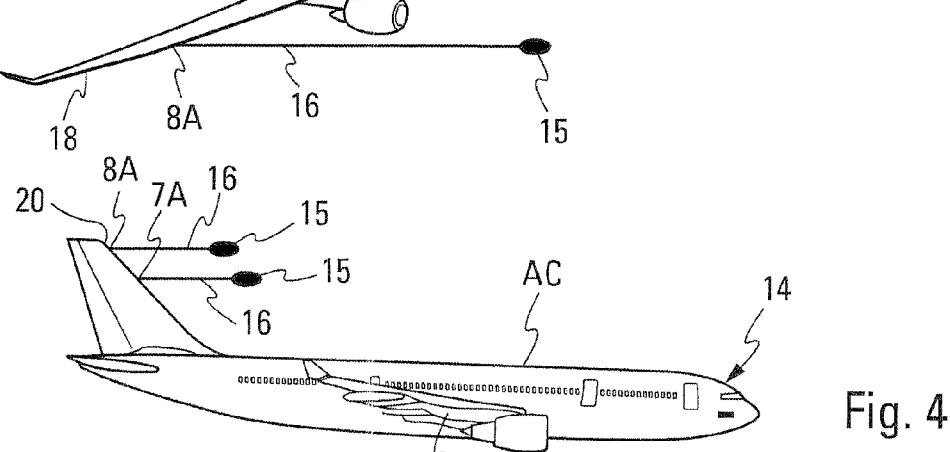
FIGS. 4 and 5 schematically illustrate respectively a third example and a fourth example of the location of the laser anemometers on the aircraft according to a variant of the embodiment of the present invention.
Figure 5:
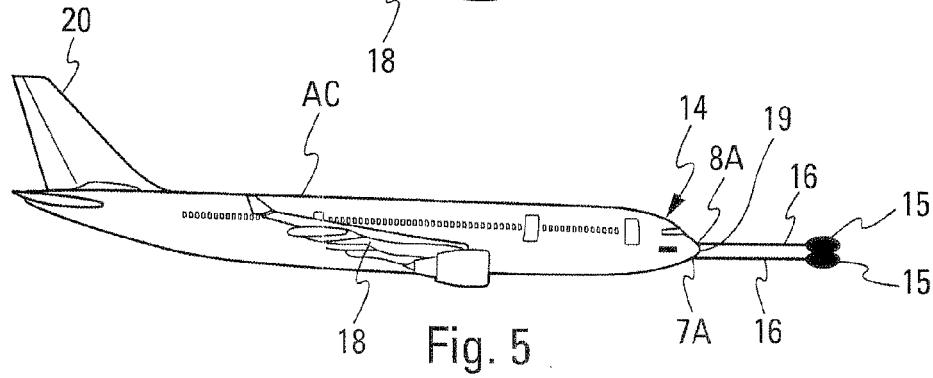

Furthermore, in a variant of the embodiment in accordance with the invention illustrated in FIGS. 4 and 5, the laser anemometers 7A and 8A can both be disposed either on the rear vertical empennage 20, or on the nose 19 of the aircraft AC.

In each of the aforementioned two cases (FIGS. 4 and 5), the laser anemometers 7A and 8A are positioned one above the other, and no longer on the left and on the right (FIGS. 2 and 3).

Whatever the location of the laser anemometers 7A and 8A on the aircraft, their focal length is chosen preferably greater than the thickness of the boundary layer which exists on the surface of the aircraft AC (said thickness depending on the speed of the aircraft).

The invention claimed is:

1. A method for monitoring parameters of an aircraft, the aircraft comprising a first display means, a second display means, and a plurality of measurement means, the method comprising:
  performing a first measurement and a second measurement of a first air speed parameter by means respectively of a first measurement means and of a second measurement means;
  performing a third measurement of said first air speed parameter by means of a first laser anemometer;
  the method further comprising:
  A) performing a fourth measurement of said first air speed parameter by means of a second laser anemometer;
  B) comparing at least one of said measurements of said first air speed parameter with a predetermined speed threshold;
  C) when at least one of said measurements of said first air speed parameter is less than or equal to said predetermined speed threshold:
    determining a first value and a second value of a second air speed parameter on the basis respectively of said third measurement and of said fourth measurement; and
    displaying said first value and said second value determined respectively on said first display means and said second display means; and
  A) when said first air speed parameter is greater than said predetermined speed threshold:
    determining a third value and a fourth value of said second air speed parameter on the basis respectively of said first measurement and of said second measurement; and
    displaying said third value and said fourth value determined respectively on said first display means and said second display means, as replacement for those currently displayed.

2. The method as claimed in claim 1, further comprising:
performing a check, prior to step D), to verify that said first measurement and said second measurement of said first air speed parameter are each valid, by comparing them with a first predefined reference value;
when said first measurement is not valid:
  remeasuring said first air speed parameter by means of said first laser anemometer,
  thereafter determining a fifth value of said second air speed parameter, and
  displaying said fifth value on said first display means; and
when said second measurement is not valid:
  remeasuring said first air speed parameter by means of said second laser anemometer
  thereafter determining a sixth value of said second air speed parameter, and
  displaying said sixth value on said second display means.

3. The method as claimed in claim 1, further comprising:
performing a fifth measurement of said first air speed parameter by means of third measurement means with which is associated a selection switch able to occupy at least one distinct first position and one distinct second position,
wherein:
  said selection switch is previously positioned in one of said positions;
  and, when said first air speed parameter is greater than said predetermined speed threshold:
    determining a seventh value of said second parameter, on the basis of said fifth measurement;
    when said selection switch occupies said first position, displaying said seventh value on said first display means, as replacement for said currently displayed value; and
    when said selection switch occupies said second position, displaying said seventh value on said second display means, as replacement for said currently displayed value.

4. The method as claimed in claim 1, further comprising, prior to steps C) and D), performing a check to verify that said third measurement and said fourth measurement of said first air speed parameter are each valid by comparison with a second predefined reference value.

5. The method as claimed in claim 1, wherein:
said first measurement means and said first laser anemometer perform respectively said first measurement and said third measurement on the left longitudinal side of said aircraft;
said second measurement means and said second laser anemometer perform respectively said second measurement and said fourth measurement on the right longitudinal side of said aircraft;
and said first and second display means are disposed respectively on the left and on the right inside the cockpit of said aircraft.

6. The method as claimed in claim 1, wherein said first air speed parameter is the true air speed (TAS) of said aircraft and said second air speed parameter is the indicated air speed (IAS) air speed displayed on said first and second display means.

7. The method as claimed in claim 1, wherein said first laser anemometer and said second laser anemometer each perform measurements in relation to a single measurement axis.

8. The method as claimed in claim 1, wherein said first laser anemometer is disposed on the left side of said aircraft and said second laser anemometer is disposed on the right side of the latter.

9. A system for the implementation of the method as specified under claim 1, said system comprising:
said first measurement means with which first processing means are associated;
said second measurement means with which second processing means are associated;
said first display means and said second display means; and
said first laser anemometer, with which first calculation means are associated,
which furthermore comprises:
at least said second laser anemometer with which second calculation means are associated; and
a selection logic device able to select, as a function of said predetermined speed threshold, on the one hand, the value of said second air speed parameter from among said first value and said third value determined respectively by said first processing means and said first calculation means so as to display it on said first display means and, on the other hand, the value of said second air speed parameter from among said second value and said fourth value determined respectively by said second processing means and said second calculation means so as to display it on said second display means.

10. An aircraft, which comprises a monitoring system as specified under claim 9.

* * * * *